United States Patent

[11] 3,576,546

[72] Inventors Philip M. Heyman
Cranbury;
Zoltan J. Kiss, Belle Mead, N.J.

[21] Appl. No. 734,166
[22] Filed June 3, 1968
[45] Patented Apr. 27, 1971
[73] Assignee RCA Corporation

[54] PHOTOCHROMIC-PHOTOCONDUCTIVE MEMORY
5 Claims, 4 Drawing Figs.

[52] U.S. Cl. ..................................................... 340/173, 250/71, 350/160
[51] Int. Cl. ..................................................... G02f 1/36, G11c 13/04
[50] Field of Search ............................................ 340/173; 350/160 (P)

[56] References Cited
UNITED STATES PATENTS

| | | | |
|---|---|---|---|
| 2,985,757 | 5/1961 | Jacobs et al. ................. | 250/83.3 |
| 3,341,825 | 9/1967 | Schrieffer..................... | 340/173 |

*Primary Examiner*—Terrell W. Fears
*Attorney*—H. Christoffersen

ABSTRACT: Memories employing a material whose photoconductivity can be altered by electromagnetic radiation such as light and which store their new value of photoconductivity upon removal of the light. Information is written into the memories optically and is read out of the memories by optical selection and electrical signal-sensing.

INVENTORS
Philip M. Heyman &
Zoltan J. Kiss
BY Samuel Cohen
ATTORNEY

INVENTORS
Philip M. Heyman & Zoltan J. Kiss
BY [signature]
ATTORNEY

PHOTOCHROMIC-PHOTOCONDUCTIVE MEMORY

BACKGROUND OF THE INVENTION

The use of photochromic materials in memory applications is known in the art. Such materials, when excited by electromagnetic radiation such as light, change their optical characteristics such as their degree of opacity and their color so that regions in the material of one optical characteristic can represent storage of binary 1 and regions in the material of another optical characteristic can represent storage of binary 0. Information is read out of memories of this type optically and this means that circuits are required for translating this optical information into electrical signals of a type suitable for handling by a digital computer.

The object of the present invention is to provide a memory which may be addressed optically both during the write and read cycles but from which information may be read electrically and at high signal-to-noise ratio.

SUMMARY OF THE INVENTION

The present invention is based on the discovery that certain types of materials such as certain photochromic materials exhibit a change in photoconductivity upon exposure to electromagnetic radiation such as light and retain their new value of photoconductivity when the light is removed. This makes it possible to employ as a memory a layer of such material and to write information into the memory optically. Information is read out of the memory by optically selecting (addressing) one or more locations in the memory and electrically sensing its or their photoconductivity.

In some forms of the invention, photoconductivity is sensed by applying a voltage across a memory location during its illumination by the radiation source employed for selection, and concurrently measuring the current flow which results. In another form of the invention, information is read out of the memory by optically dissipating a charge which is present at the memory locations of relatively high photoconductivity and later electrically sensing the amount of charge which is redeposited at the respective memory locations during the recharging of the memory.

DETAILED DESCRIPTION

Figure 1:
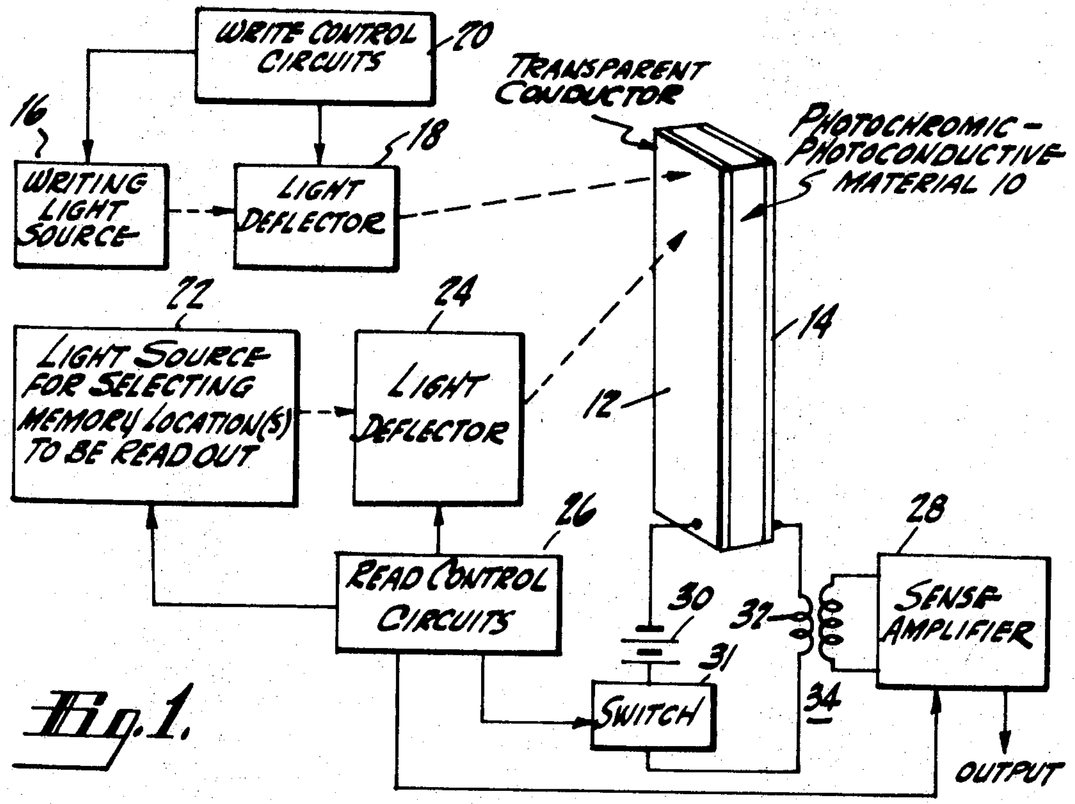
FIG. 1 is a block diagram of one form of the memory according to the invention.

The memory of FIG. 1 includes a photochromic, photoconductive layer of material 10 which is sandwiched between two conductors 12 and 14. Conductor 12 is a transparent conductor such as tin oxide and conductor 14 may be opaque and may be formed of a material such as silver. The photochromic, photoconductive material may be a rare earth doped material such as gadolinium-doped calcium fluoride (Gd:$CaF_2$). Other examples are given later.

It has been discovered that the photochromic material above and others which will be mentioned later exhibit photoconductive properties. When Gd:$CaF_2$ is illuminated by blue light, such as light at a wavelength of 4,000 Angstroms (A.), the photoconductive sensitivity of the material greatly increases for red light (6,500 A.). The amount of change is quite large and may be greater than 500:1, that is, the photoconductivity of the excited material may be 500 or more times larger than that of the unexcited material for red light. During the light excitation, the color of the material also changes from blue-green to purple.

When the source of excitation light is removed, the material continues to retain its new high value of photoconductivity and it continues to remain at its new color. The length of time the material will store the new color and new value of photoconductivity may be months or more depending on many different parameters including temperature, amount of doping and so on.

The "information" stored in photochromic material such as described above, may be read out electrically in response to light excitation at a different frequency. For example, red light at a wavelength of 6,500 A. may be shined on the material. If during the time this light is shined on the material a voltage is applied across the material and the value of the current which flows is sensed, it readily can be determined whether or not the material previously was sensitized (whether or not information was written into the material). If the material previously was exposed to sensitizing light at 4.000 A., then when later read out, a relatively large current will pass through the material in view of its relatively high photoconductivity whereas the reverse is the case if the material previously was not sensitized. The ratio between the high and low photoconductivity states of the material, which in computer terms may be referred to as the 1 to 0 ratio, is at least 50 times greater than the 1 to 0 ratio for the conventionally optically read out photochromic material.

The complete system of FIG. 1 includes a writing light source 16 which produces a highly focused beam of light in the writing frequency range as, for example, at 4,000 A. for gadolinium-doped calcium fluoride. This light is deflected by the light deflector 18 to a desired location in the memory. The light deflector in itself is well known and may be mechanical in nature in which case it may include lenses, mirrors and means for controlling the positions of the mirrors or it may be any one of a number of known electro-optic deflectors. The light deflector and writing light source are controlled by the write control circuits 20.

Figure 2:
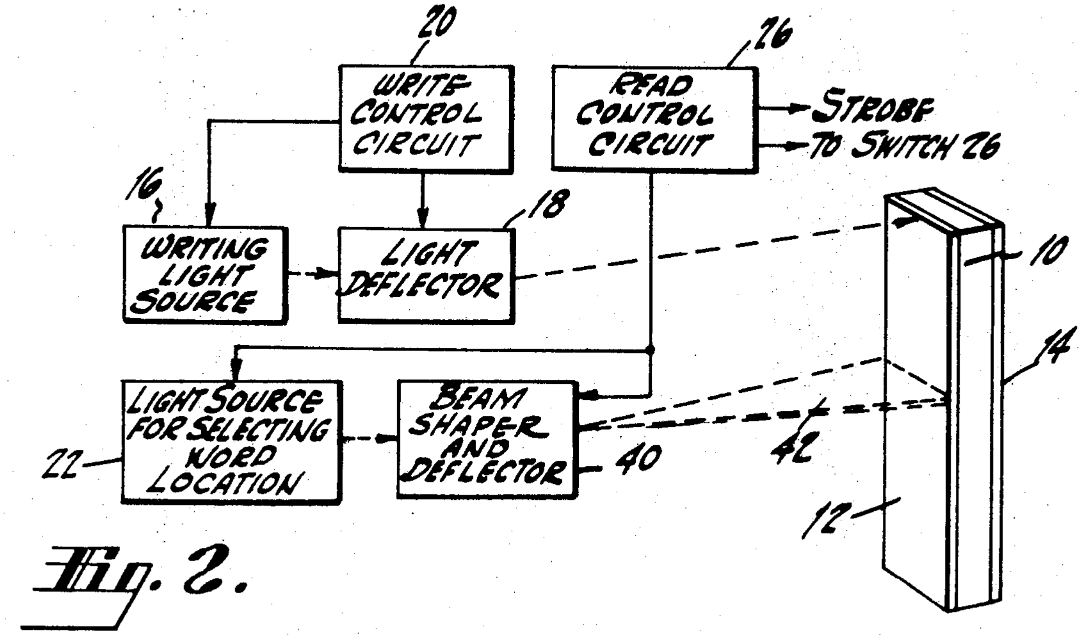
FIG. 2 is a block diagram of another form of memory according to the invention.

The readout arrangement for the system of FIG. 2 includes a light source 22 at the readout frequency which may be 6,500 A. for Gd:$CaF_2$. The light deflector 24, which may be similar to the light deflector 18, deflects the light to a desired location or locations in the memory. The read control circuits 26 control the operation of the source 22 and deflector 24 and also provide the strobe pulse for the sense amplifier 28. The readout circuits also include a source of voltage, shown as a battery 30, which is connected across the two conductive plates 12 and 14. The primary winding 32 of transformer 34 may be connected in series with the battery circuit. A normally open switch 31, which preferably is an electronic switch, is in series with the battery and is controlled by the read control circuits 26.

In the operation of the system of FIG. 1, when it is desired to write information into a particular location in the memory, the write control circuits 20 actuate the writing light source 16 and the light deflector 18. The light deflector causes the light beam, which is a highly focused beam of light from, for example, a laser, to be directed to a particular location in the memory. This beam causes the photoconductivity of the photochromic, photoconductive material substantially to increase at the particular location illuminated by the beam. The beam also causes the color and/or the opacity of the material to change at that location. While for purposes of the present application, an understanding of the theory of why the changes in photoconductivity and color occur is not needed, it might be mentioned, in passing, that the two effects are believed to be related and are believed to be due to the presence of two defect levels in the forbidden gap of $CaF_2$. These levels are located 3.1 eV (4,000 A.) and 2.3 eV (5,400 A.) below the conduction band.

In thermal equilibrium, the 4,000 A. level is occupied and the 5,400 A. level is essentially empty. Since the 5,400 A. level is unoccupied, no 5,400 A. photons can be absorbed by it and therefore, there will be no photoconductive response for these 5,400 A. photons. If the crystal is now illuminated by 4,000 A.

light, electrons in the 4,000 A. level are photoexcited to the conduction band where they cause increased electrical conductivity until they are retrapped. If the conduction electrons are trapped by the empty 5,400 A. level, the material now has the ability to absorb 5,400 A. radiation and this is manifested by a change in color from one which absorbs 4,000 A. light (blue) to one which absorbs 5,400 A. light (green). Electrons excited to the conduction band from the 5,400 A. level cause the conductivity of the material to increase so that there now is a photoconductive response to 5,400 A. photons. Therefore, both the color and the photoconductive spectral sensitivity of the material are altered by its exposure to blue light. Although the defect level is nominally placed 5,400 A. below the conduction band, thermal and electrical processes in the crystal broaden the absorption so that the photoconductivity due to the emptying of this level is decreased only slightly by 6,500 A. Going from 5,400 A. to 6,500 A., however, causes the photoconductivity due to the emptying of the 4,000 A. level to decrease by a factor of five to 10 so that operating at 6,500 A. improves the 1 to 0 ratio by a factor of five to 10.

When the 4,000 A. write beam is turned off, the resistivity of a memory location previously illuminated again increases to a very high value. (The material 10 acts like an insulator.) However, its photoresistance remains low and is stored. In other words, if this previously illuminated location (previously illuminated by 4,000 A. light) is later illuminated by light in an appropriately chosen frequency band, the low photoresistance (high photoconductivity) of this location will reappear.

Readout of the information stored in the memory may be achieved in one of several ways. In one mode of operation, the read control circuits 26 close the switch 31 so that a voltage is present across the photochromic material 10. Concurrently, circuits 26 cause the light source 22 and light deflector 24 to direct a highly focused beam of light at 6,500 A. at the storage location it is desired to read out. If that location was previously exposed to the writing light source, its photoconductivity, in the presence of this 6,500 A. light, will be relatively high. In this case, the voltage source 30 will cause a substantial amount of current flow to occur in the circuit which includes the primary winding 32 of the transformer. This results in a pulse applied to the sense amplifier 28. During the time the pulse occurs, the read control circuits 26 strobe the sense amplifier so that the sense amplifier produces an output. If, on the other hand, the location being read out was not previously exposed to light from source 16, its photoconductivity, in the presence of the 6,500 A. light, will be relatively low and very little current will flow through the primary winding 32 of the transformer. In this case, the strobed sense amplifier will produce a very low amplitude output, perhaps $1/500^{th}$ that produced when reading a sensitized location.

In another form of the invention, the conductive backplate 14 of the memory, rather than consisting of a continuous layer, is made up instead of a plurality of conductive dots, each defining one storage location. In this form of memory, there is one circuit 30, 32, 34, 28 for each such dot. To operate a memory of this kind, the light source 22 and the light deflector 24 cause the entire surface of the transparent conductor 12 to be flooded with light. In response thereto, all of the storage locations may be read out simultaneously (in parallel). Each memory location storing a 1 will produce a relatively large amplitude sense signal at the sense amplifier for that location and each memory location storing a 0 will produce a relatively small output at the sense amplifier for that location.

Figure 3:
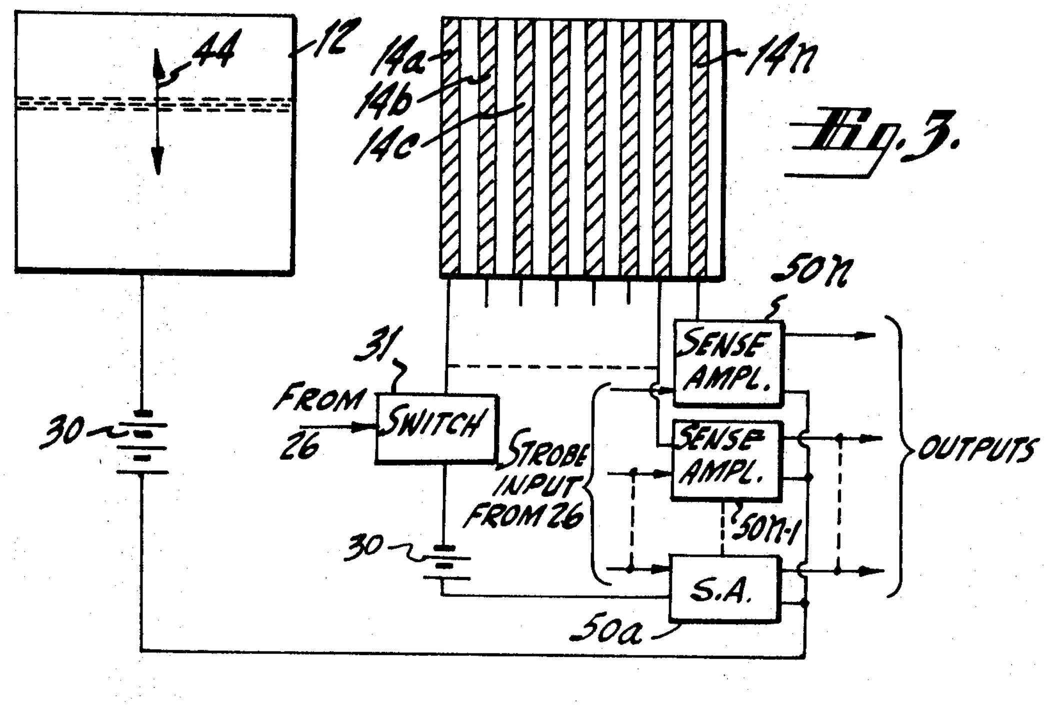
FIG. 3 is a schematic showing of a portion of the memory of the FIG. 2.

Another embodiment of the invention is shown in FIGS. 2 and 3. The memory includes a transparent conductor 12 and a photochromic, photoconductive layer 10, just as in the memory of FIG. 1. However, the backplate 14, rather than being continuous or a matrix of dots, is instead a plurality of column conductors 14*a*, 14*b*...14*n*, as shown in FIG. 3. While for purposes of illustration, only eight conductors are shown, it should be appreciated that the number *n* of such conductors, in practice, can be arbitrarily large.

The write circuits 16, 18 and 20 are exactly the same as the write circuits of the embodiment of FIG. 1. However, the read circuits include a beam shaper within block 40 which converts the light from source 22 to a fan-shaped beam 42. This beam can be deflected by means also within block 40, in the direction of arrows 44 of FIG. 3, to one of a number of different positions. (Note that in FIG. 3, the front conductor 12 and back conductors 14 are shown separately and both in plan view although the actual structure is as shown in FIG. 2.)

In the operation of the system of FIGS. 2 and 3, information is written into the memory in the same manner as already described for FIG. 1. Information is read out of the memory a word at a time by closing switch 31 and illuminating a desired word location in the memory by the light source 20 and beam shaper and deflector 40. (A word consists of a number *n* of binary digits, each digit corresponding to the intersection of the light beam and a column conductor.) For example, to read the topmost word of the memory out of the memory, a fan-shaped beam 42 is deflected to the topmost word location. The *n* bits previously written into this word location then cause outputs to be produced at the strobed sense amplifiers 50*a*...50*n*. The sense amplifiers are shown to be directly connected in the battery circuit 30 are are assumed to include a direct connection internal of the sense amplifiers to permit the voltage source 30 to apply voltages to the various column conductors.

Figure 4:
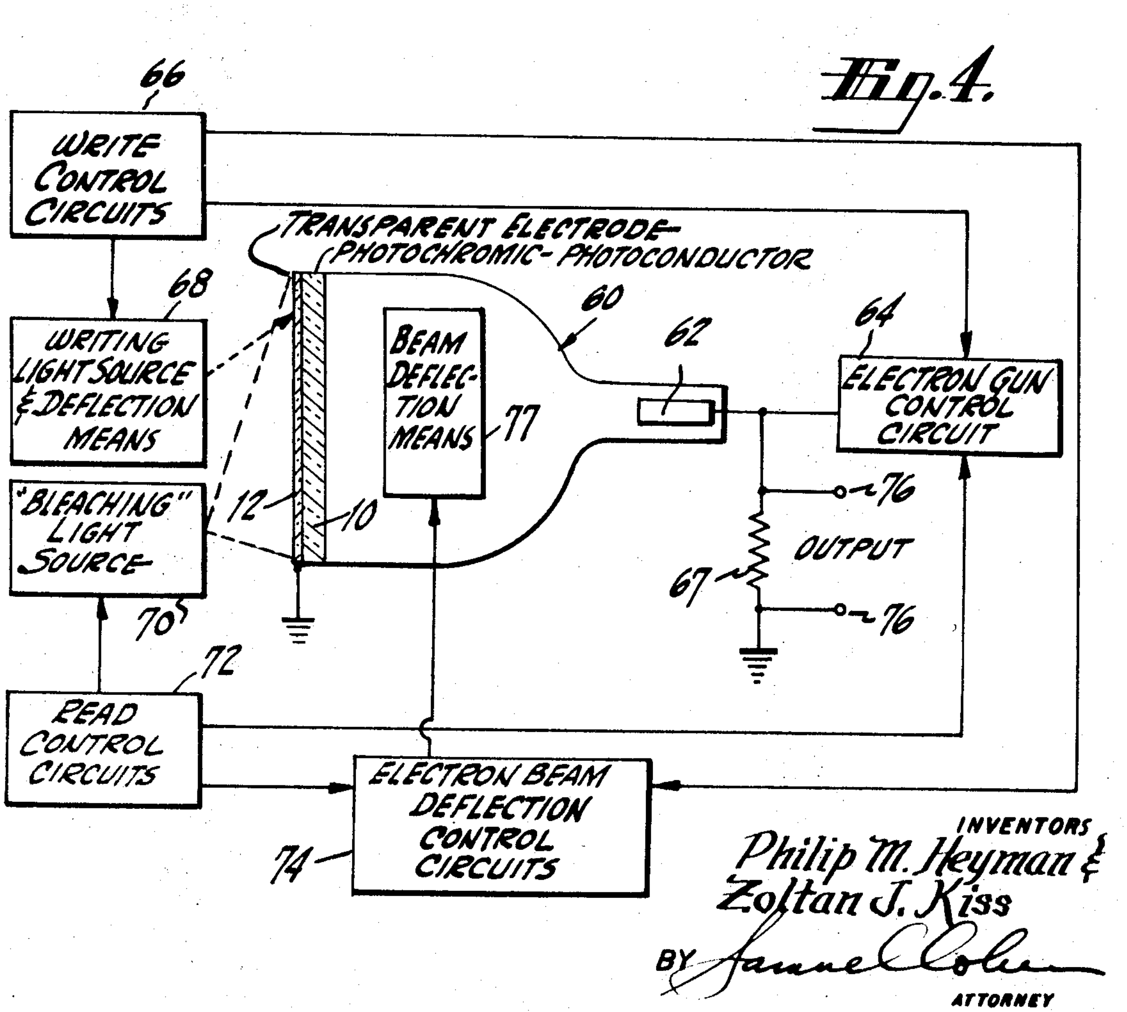
FIG. 4 is a block and schematic diagram of another form of memory according to the invention.

Another form of the invention is shown in FIG. 4. Here, the transparent electrode 12 and the photochromic, photoconductive layer 10 are located within a cathode-ray tube 60. The electron gun, shown schematically at 62, is controlled by an electron gun control circuit 64. The gun circuit is returned to ground through resistor 67 and the transparent electrode 12 is also connected to ground.

The writing means include the write control circuits 66 and the writing light source and deflection means 68. The read circuits include the "bleaching" light source 70 and the read control circuits 72. The reading means also includes electron beam deflection control circuits 74 which are connected to the beam deflection means shown schematically at 77.

In the operation of the arrangement of FIG. 4, information is written into the photochromic, photoconductive layer 10 by selectively deflecting the writing light produced by source 68 in the manner already described. The electron beam is off during this interval. Then the electron beam is turned on by the electron beam deflection control circuits 74 under the control of the write control circuits 66 and is caused to charge the back surface of the photochromic, photoconductor layer 10, in television raster fashion. This charging continues until the output voltage across the resistor 67 drops to zero which means that the layer 10 can accumulate no more charge. Note that in the absence of light excitation, the layer 10 acts like an insulator and its resistance is so high that the charge it accumulates on its back surface cannot leak off to ground through electrode 12.

To read the memory, the transparent electrode 12 is flooded with light by the bleaching light source 70. This light is in the readout frequency band as, for example, at 6,500 A. for gadolinium-doped, photochromic calcium fluoride. The bleaching light causes the charge present at those portions of the memory which were previously exposed to the 4,000 A. light from the writing source 68 to discharge to ground through the conductor 12. The reason is that in the presence of 4,000 A. light, these regions exhibit their stored high value of photoconductivity (low resistance) and this permits the charge to pass through the material to the conductor 12. The regions of the layer 10 which were not exposed to writing light, however, retain their high resistivity when illuminated by 6,500 A. light and do not discharge their charge.

The memory now may be read out by causing the electron beam 62 again to raster-scan the back surface of the layer 10. Those memory locations storing a 1 (the locations previously illuminated by the 4,000 A. write light beam) all of which were discharged by the bleaching light source 10, will now again accumulate a charge. Each time a location accumulates a charge, current flows through resistor 67 and an output pulse is produced at terminals 76. On the other hand, if a location is storing a 0, that is, if it was not previously illuminated by source 68, it will already be charged at the time the recharging electron beam passes over that location. Therefore, the electron beam cannot further charge such locations to any appreciable extent and essentially no current flows through the resistor 67 when such locations are "addressed" by the beam.

The present invention is operative with many different types of photochromic-photoconductor materials in addition to the one already given. These include calcium fluoride ($CaF_2$) doped with any one of the following rare earths: Cerium (Ce), Lanthanum (La) or Terbium (Tb): Strontium Titanate ($SrTiO_3$) or Calcium Titanate ($CaTiO_3$) doped with one or a combination of the following: cobalt, iron, molybdenum or nickel. Typical amounts of doping material are under 1 percent and, for example, may be in the range of from under 0.05 percent to over 0.1 percent. All of the material discussed above may be manufactured by techniques well understood in the art. For example, typical methods of manufacturing $CaF_2$, $SrTiO_3$ and $CaTiO_3$ are the so-called "gradient freeze" technique and the "flame fusion" technique both of which are described in the literature.

It is also to be understood that while the write and read frequencies for $Gd:CaF_2$ are specified as 4,000 A. and 6,500 A., respectively, the memory can be operated over a range of frequencies proportional to the widths of the peaks in the optical absorption spectrum of this material. For other materials, the write and read frequencies may be different and will depend, in each case, upon where the peaks in the optical absorption spectra for the respective materials occur. In some cases, it is possible to employ light in the invisible region of the spectrum such as ultraviolet rays. Excitation of the photochromic material by other forms of electromagnetic radiation such as gamma or X-rays or electron beam bombardment is also possible.

We claim:

1. A memory comprising, in combination:

a layer of photochromic-photoconductive material;

means for selectively illuminating subareas of the medium by light in a frequency range which causes the photoconductivity of these subareas to change and to remain at a new value after removal of said light;

means for charging said medium after said selective illumination thereof; and means for reading the information stored in said layer comprising means for illuminating said subareas by light in a frequency range at which the medium exhibits its new value of photoconductivity, means for recharging said medium after the application thereto of said light in said frequency range at which the medium exhibits its new value of photoconductivity, and means for sensing the relative amounts of charge deposited at the respective subareas in response to said recharging.

2. A memory as set forth in claim 1, wherein said means for charging and said means for recharging comprises:

means producing a beam of electrons; and means for directing said beam of electrons at said layer of photochromic-photoconductive material.

3. A memory as set forth in claim 2, wherein said means for directing said beam of electrons at said medium comprises means for raster scanning said beam of electrons over the surface of said medium.

4. A memory as set forth in claim 2, wherein said photochromic-photoconductive material comprises the face of a cathode-ray tube, said means producing a beam of electrons comprising an electron gun within said cathode-ray tube, and further including a transparent conductive layer on said face forming the outer layer of said face.

5. A memory as set forth in claim 1, wherein said medium is a rare earth-doped calcium fluoride.